United States Patent
Yokomori

(10) Patent No.: US 7,434,354 B2
(45) Date of Patent: Oct. 14, 2008

(54) POWER DEVICE FOR OPENING AND CLOSING A VEHICLE SLIDING DOOR

(75) Inventor: Kazuhito Yokomori, Yamanashi-ken (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 374 days.

(21) Appl. No.: 10/971,707

(22) Filed: Oct. 25, 2004

(65) Prior Publication Data
US 2005/0253414 A1    Nov. 17, 2005

(30) Foreign Application Priority Data
Oct. 24, 2003    (JP)    ............... 2003-364676

(51) Int. Cl.
*E05F 11/04*    (2006.01)

(52) U.S. Cl. ............... 49/360; 192/114 R

(58) Field of Classification Search ............... 49/360; 318/55, 56, 57; 192/84.7, 114 R, 48.2
See application file for complete search history.

(56) References Cited

U.S. PATENT DOCUMENTS

| | | | | |
|---|---|---|---|---|
| 4,269,294 A | * | 5/1981 | Kelbel | ............... 192/54.2 |
| 4,945,780 A | * | 8/1990 | Bosma | ............... 74/337.5 |
| 5,394,967 A | * | 3/1995 | Bigley | ............... 192/69.4 |
| 5,908,080 A | * | 6/1999 | Bigley et al. | ............... 180/247 |
| 6,092,336 A | * | 7/2000 | Wright et al. | ............... 49/339 |
| 6,882,120 B2 | * | 4/2005 | Yokomori | ............... 318/55 |
| 7,003,915 B2 | * | 2/2006 | Yokomori | ............... 49/360 |
| 2005/0001568 A1 | | 1/2005 | Yokomori | |
| 2005/0102905 A1 | * | 5/2005 | Ichinose | ............... 49/360 |
| 2006/0011441 A1 | * | 1/2006 | Showalter | ............... 192/84.6 |
| 2006/0112643 A1 | * | 6/2006 | Yokomori et al. | ............... 49/360 |
| 2007/0163857 A1 | * | 7/2007 | Yokomori | ............... 192/215 |

\* cited by examiner

*Primary Examiner*—Gregory J. Strimbu
(74) *Attorney, Agent, or Firm*—Browdy and Neimark, PLLC

(57) ABSTRACT

A clutch mechanism of the power device includes a movable gear member which is rotated integrally with a wheel and engaged with a stationary gear member when moved in a first direction and disengaged from the stationary gear member when moved in a second direction opposite to the first direction, an armature which moves the movable gear member in the first direction when rotated relatively to the movable gear member, and an electromagnetic coil for applying brake resistance to the armature by attracting the armature by magnetic force to restrict a co-rotating state of the armature and the movable gear member. The armature has a clutch holding surface for maintaining a clutch-engaged state where the movable gear member and the stationary gear member are engaged with each other even when the electromagnetic coil is turned off in the clutch-engaged state.

4 Claims, 8 Drawing Sheets

POWER DEVICE FOR OPENING AND CLOSING A VEHICLE SLIDING DOOR

FIELD OF THE INVENTION

The present invention relates to a power device and more particularly to a power device which slides a sliding door in a door-opening direction and a door-closing direction.

DESCRIPTION OF THE RELATED ART

A conventional vehicle sliding door may be equipped with power devices such as a power slide device for sliding the sliding door in the door-opening direction and the door-closing direction by motor power, a power close device for moving the sliding door from a half-latched position to a full-latched position by motor power and a power release device for unlatching a door latch device of the sliding door by motor power.

The power device, particularly the power device used as a power slide device, is equipped with a clutch mechanism for transmitting motor power to the sliding door. The clutch mechanism is classified broadly into a mechanical clutch mechanism and an electromagnetic clutch mechanism, and they have advantages and disadvantages, respectively.

The mechanical clutch mechanism has an advantage that it includes few electrical components and thus can be manufactured with low cost. However, the mechanical clutch mechanism involves a time lag in switching the clutch from the disengaged state to the engaged state or vice versa. This time lag complicates control programs for mechanical clutch mechanism.

On the contrary, with electromagnetic clutch mechanism, switching from the disengaged state to the engaged state or vice versa can be rapidly achieved. Thus, its control programs can be dramatically simplified. However, electromagnetic clutch device applicable to a high-output power device such as a power slide device have a disadvantage that it requires a large, high cost electromagnetic coil.

There will be described the reason that a large electromagnetic coil is required. There are some kinds of electromagnetic clutch mechanisms which are broadly classified into a frictional clutch and a dog clutch. The frictional clutch is connected by causing an armature to come into contact with a frictional rotary plate by the magnetic force of the electromagnetic coil. The magnitude of the output which can be transmitted by the clutch depends on the magnitude of a friction coefficient between the armature and the rotary plate. Therefore, a high-output power device such as a power slide device requires a high-power electromagnetic coil for providing a large friction coefficient.

In contrast, the dog clutch is connected by causing a rugged portion of an armature to mesh with a rugged portion of a rotary plate. In the mesh executed between the rugged portions, the magnitude of a force for pressing the armature against the rotary plate does not substantially affect the magnitude of output that can be transmitted by the clutch. In the dog clutch, however, the moving distance of the armature, which is required for the armature to be meshed with the rotary plate is greatly longer than that of the armature required in the frictional clutch. The typical moving distance of the armature of the frictional clutch is 1 mm or less, so that it can be moved by the small magnetic force of a compact electromagnetic coil. However, in the dog clutch, the armature must be typically moved by a distance of 3 to 5 mm. The magnetic force drastically decreases as the distance increases, so that the electromagnetic coil must be large in order to move the armature of dog clutch.

In order to overcome the problems, the present inventor has suggested a power device including a clutch mechanism using a combination of a mechanical clutch mechanism and an electromagnetic clutch mechanism (U.S. patent application Ser. No. 10/611,642).

With the configuration of the previously-filed application, when the electromagnetic coil is turned off, this causes the clutch mechanism to return from the engaged state to the disengaged state. Therefore, this configuration has problems in terms of operability and usability.

SUMMARY OF THE INVENTION

Therefore, it is an object of the present invention to provide a power device including a clutch mechanism capable of maintaining the engaged state of the clutch even if the electromagnetic coil is turned off.

DESCRIPTION OF THE PREFERRED EMBODIMENT

Figure 2:
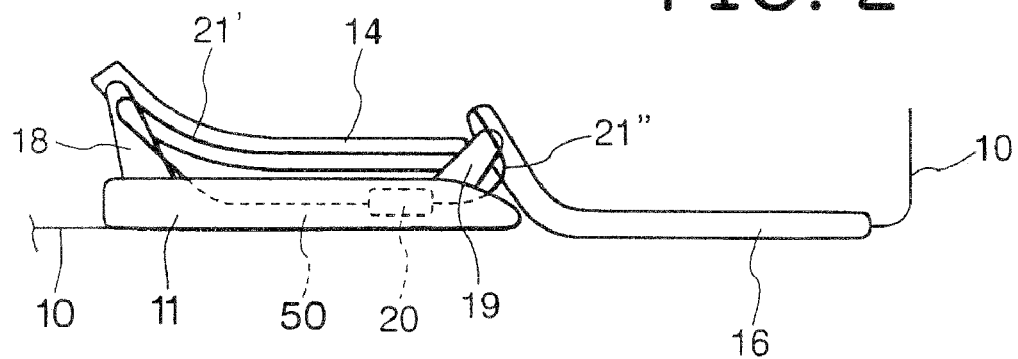
FIG. 2 is a view illustrating a relation between the power unit and wire cables, wherein a sliding door is closed.
Figure 3:
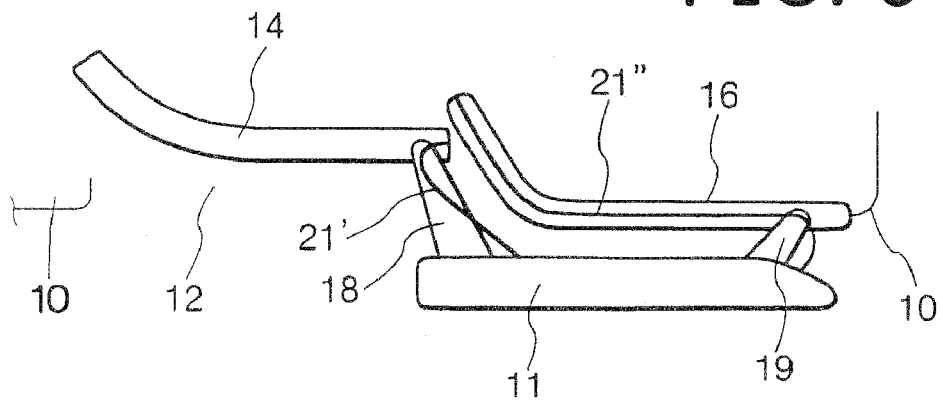
FIG. 3 is a view illustrating a relation between the power unit and wire cables, wherein the sliding door is opened.

An embodiment of the present invention will be described with reference to the drawings. FIG. 2 shows a vehicle body 10, a sliding door 11 which is slidably mounted to the vehicle body 10, and a door ingress/egress aperture 12 which can be closed by the sliding door 11. An upper rail 13 is secured to the vehicle body 10 in the vicinity of an the upper portion of the door aperture 12, a lower rail 14 is secured to the vehicle body 10 in the vicinity of an lower portion of the door aperture 12, and a center rail 16 is secured to a quarter panel 15 which is a rear side surface of the vehicle body 10. The sliding door 11 is provided with an upper bracket 17 which is slidably engaged with the upper rail 13, a lower bracket 18 which is slidably engaged with the lower rail 14, and a center bracket 19 which is slidably engaged with the center rail 16. Preferably, each bracket 17, 18, 19 is rotatably mounted to the sliding door 11 and the sliding door 11 is slidable in the door-opening direction and in the door-closing direction by the engagement between these brackets and these rails.

Figure 6:
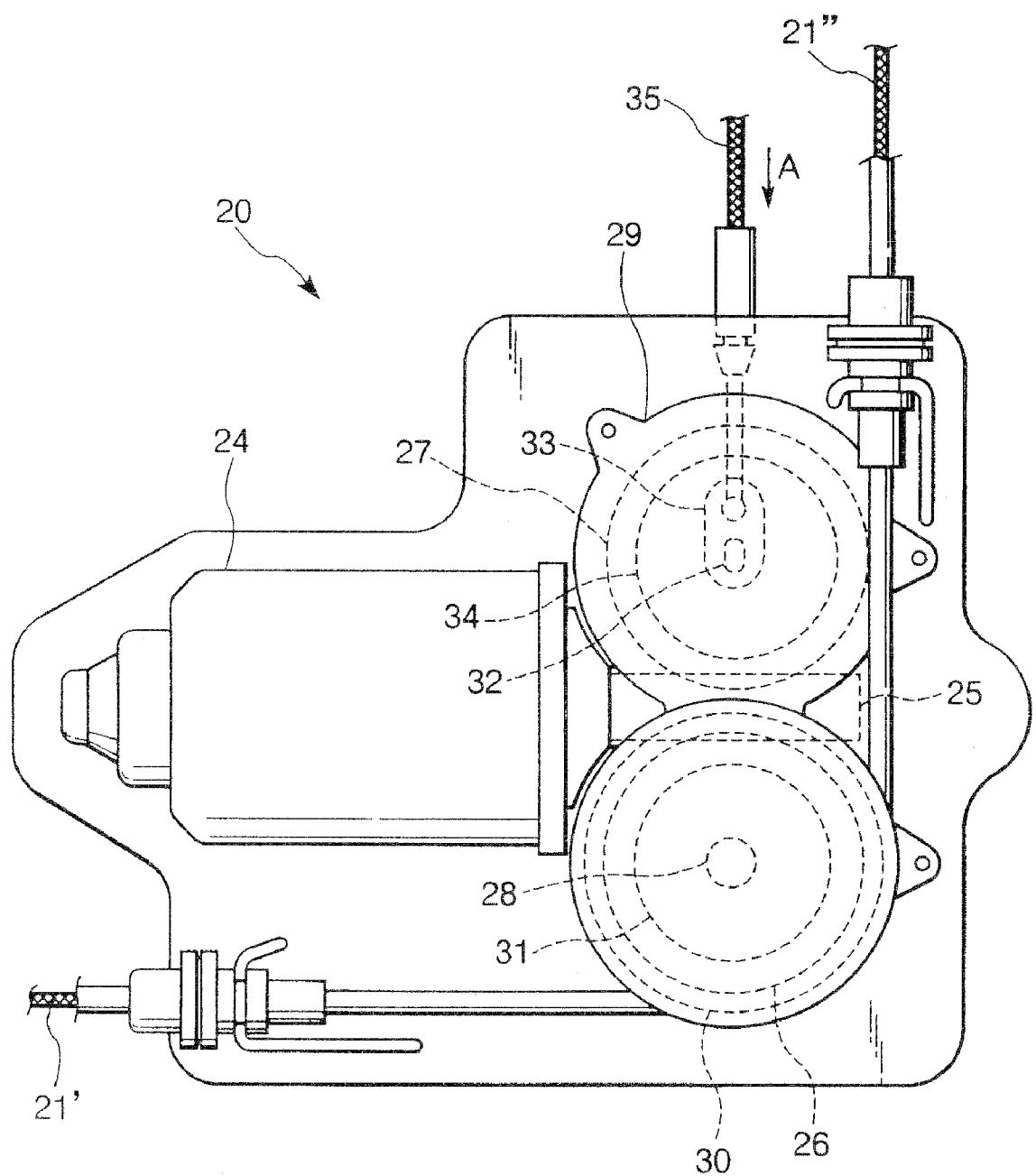
FIG. 6 is a side view of the power unit.
Figure 7:
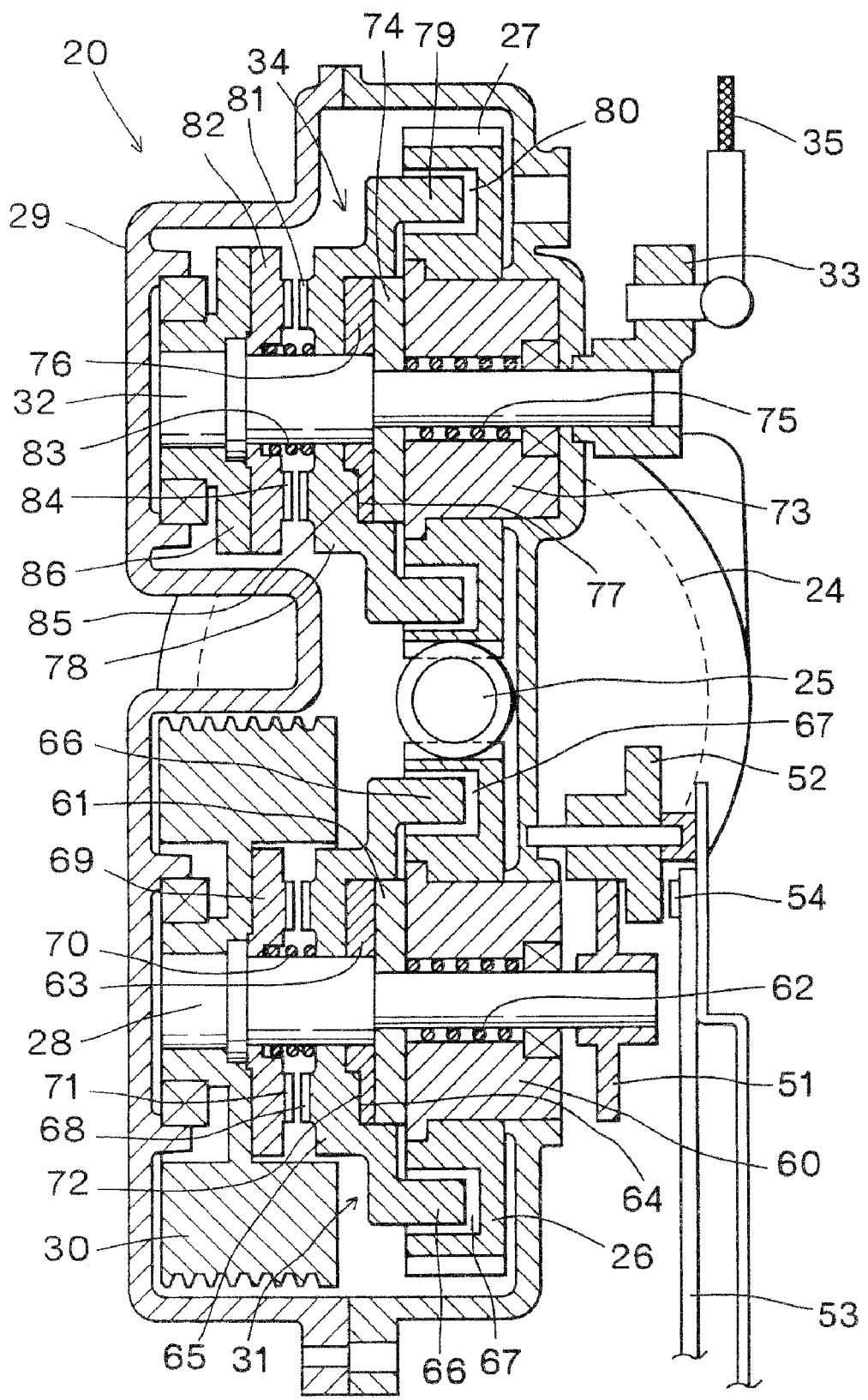
FIG. 7 is a cross sectional view of the power unit.

A power unit 20 with motor power is provided within the inner space 50 (FIG. 2) of the sliding door 11. The power unit 20 includes a wire drum 30, as shown in FIGS. 6 and 7, for winding and paying out two wire cables, namely a door-opening cable 21' and a door-closing cable 21", base ends of which are connected to the wire drum 30. When the wire drum 30 rotates in the door-opening direction, the door-opening cable 21' is wound and the door-closing cable 21" is paid out, and when the wire drum 30 rotates in the door-closing direction, the door-opening cable 21' is paid out and the door-closing cable 21" is wound.

Figure 4:
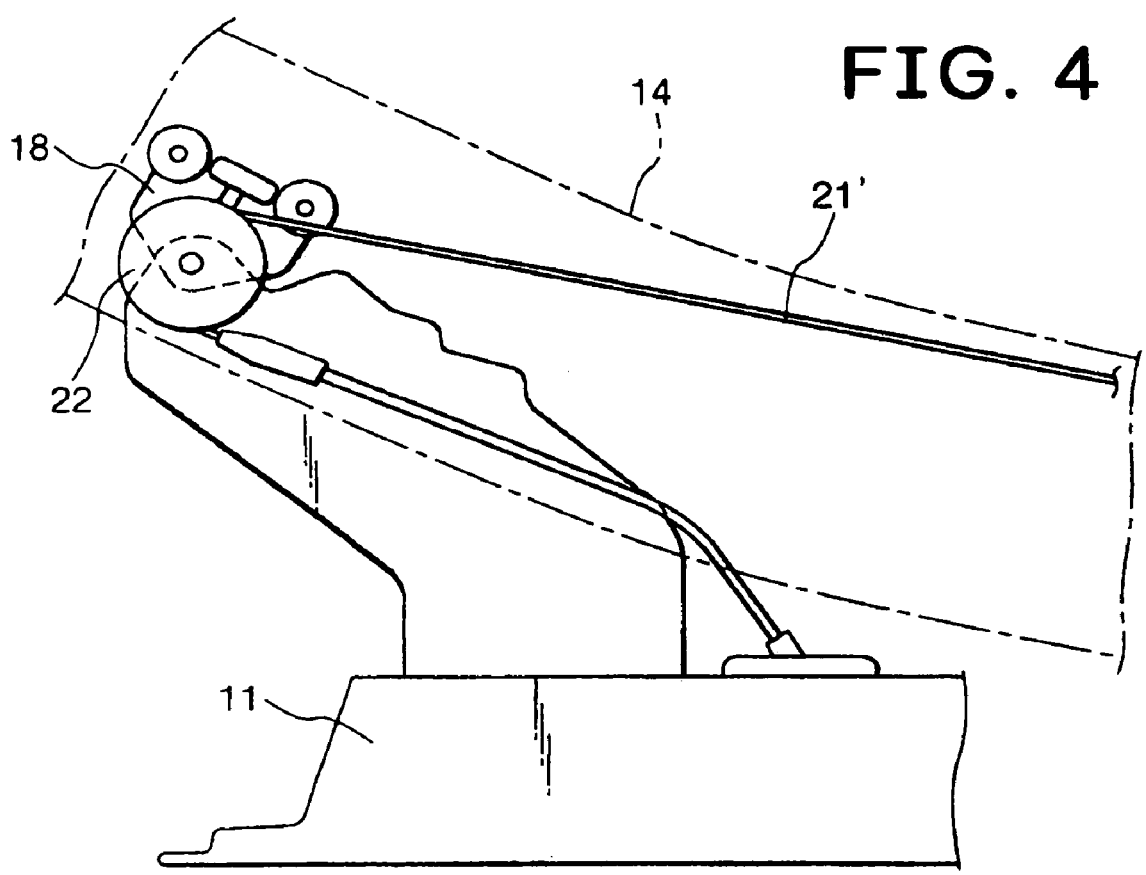
FIG. 4 is an enlarged plan view of a lower rail and a lower roller bracket on the sliding door.

As shown in FIG. 4, the door-opening cable 21' is drawn out from a front lower position of the sliding door 11, namely a position in the vicinity of the lower bracket 18, toward the vehicle body (toward the lower bracket 18) to the outside of the sliding door 11. The lower bracket 18 is provided with a pulley 22 having a vertical axial center, and the door-opening cable 21' which is paid out from the sliding door 11 passes by the front side of the pulley 22, then extends rearward through the lower rail 14, and is secured to the rear end portion of the lower rail 14 or to the vehicle body 10 in the vicinity of the rear end portion. Thus, when the door-opening cable 21' is wound in the state where the door is closed, the sliding door 11 slides rearward (in the door-opening direction) through the lower bracket 18.

Figure 5:
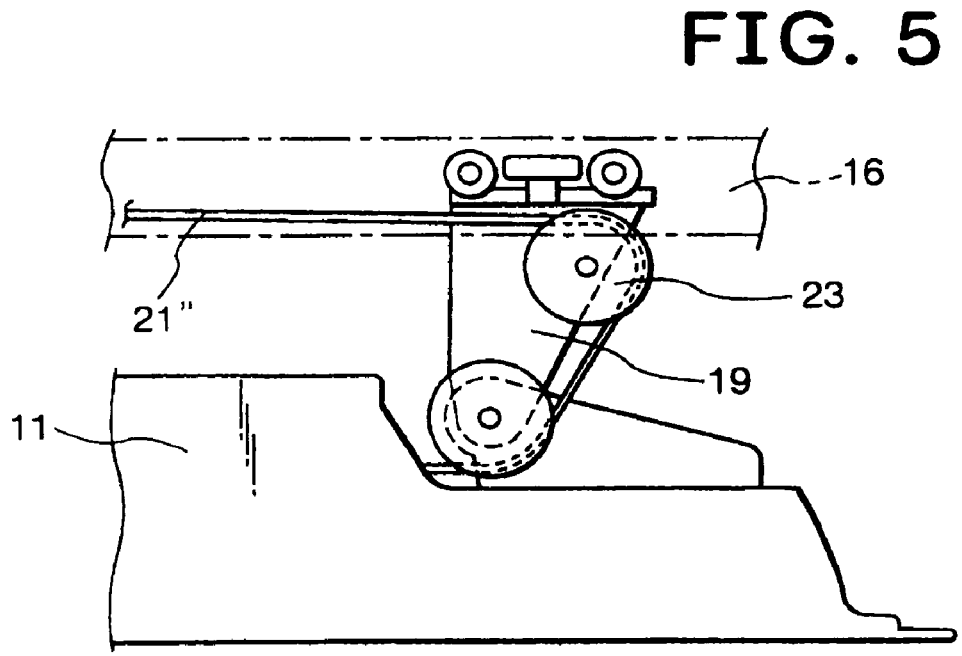
FIG. 5 is an enlarged plan view of a center rail and a center roller bracket on the sliding door.

As shown in FIG. 5, the door-closing cable 21" is drawn out from a central position in an up-and-down direction of the sliding door 11 on the rear side thereof, i.e. from a position in the vicinity of the center bracket 19 toward the vehicle body (toward the center bracket 19) to the outside of the sliding door 11. The center bracket 19 is provided with a pulley 23 having a vertical axial center, and the door-closing cable 21" which is paid out from the sliding door 11 passes by the rear side of the pulley 23, then extends forward through the center rail 16, and is secured to the front end portion of the center rail 16 or to the vehicle body 10 in the vicinity of the front end portion. Thus, when the door-closing cable 21" is wound in the state where the door is opened, the sliding door 11 slides forward (in the door-closing direction) through the center bracket 19.

Referring to FIGS. 6 and 7, a cylindrical worm 25 is mounted to an output shaft of a high-power motor 24, and a first worm wheel 26 and a second worm wheel 27 are provided on both the sides of the axial center of the cylindrical worm 25 such that they are meshed with the cylindrical worm 25, respectively. The first worm wheel 26 is pivotally mounted on a first supporting shaft 28 within a case 29 of the power unit 20, and the wire drum 30 is also pivotally mounted on the first supporting shaft 28. A first clutch 31 is provided between the first worm wheel 26 and the wire drum 30. When the first clutch 31 is turned on, the rotation of the first worm wheel 26 is transmitted to the wire drum 30, and when the first clutch 31 is turned off, the wire drum 30 becomes free with respect to the first worm wheel 26. Therefore, in FIG. 6, if the first clutch 31 is turned on while the first worm wheel 26 is being rotated in the clockwise direction by the normal rotation of the motor 24, the wire drum 30 is also rotated clockwise, thereby the door-opening cable 21' is paid out and the door-closing cable 21" is wound. On the contrary, if the first clutch 31 is turned on while the first worm wheel 26 is being rotated counterclockwise by the reverse rotation of the motor 24, the wire drum 30 is also rotated counterclockwise, thereby the door-opening cable 21' is wound and the door-closing cable 21" is paid out. This function of rotating the wire drum 30 through the power of the motor 24 for winding and paying out the cables 21', 21" is the power sliding function of the power unit 20.

The cylindrical worm 25 and the first worm wheel 26 are related to each other such that any rotational force applied to the first worm wheel 26 does not cause the cylindrical worm 25 to rotate.

The second worm wheel 27 is pivotally mounted on a second supporting shaft 32 within the case 29 of the power unit 20. One end portion of the second supporting shaft 32 penetrates the case 29 and protrudes to the outside of the case, and a swing arm 33 is secured to the protruded portion of the second shaft. A second clutch 34 is provided between the second worm wheel 27 and the second supporting shaft 32. When the second clutch 34 is turned on, the rotation of the second worm wheel 27 is transmitted to the swing arm 33 through the second supporting shaft 32, and when the second clutch 34 is turned off, the swing arm 33 becomes free with respect to the second worm wheel 27.

Figure 1:
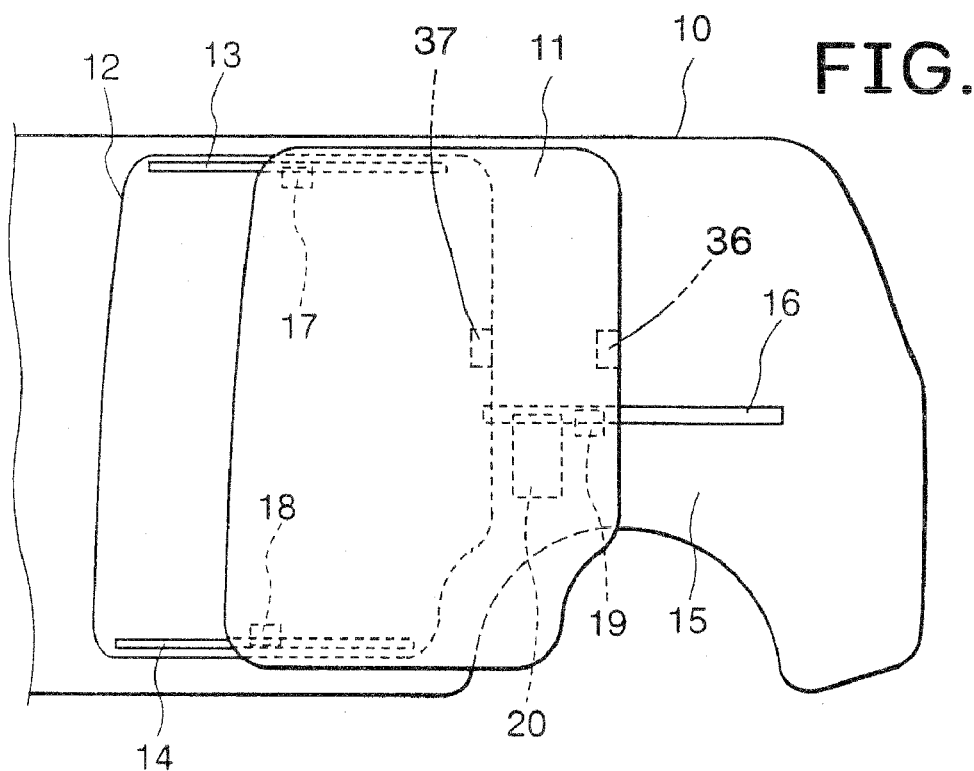
FIG. 1 is a side view of a vehicle provided with a power unit according to the present invention.
Figure 8:
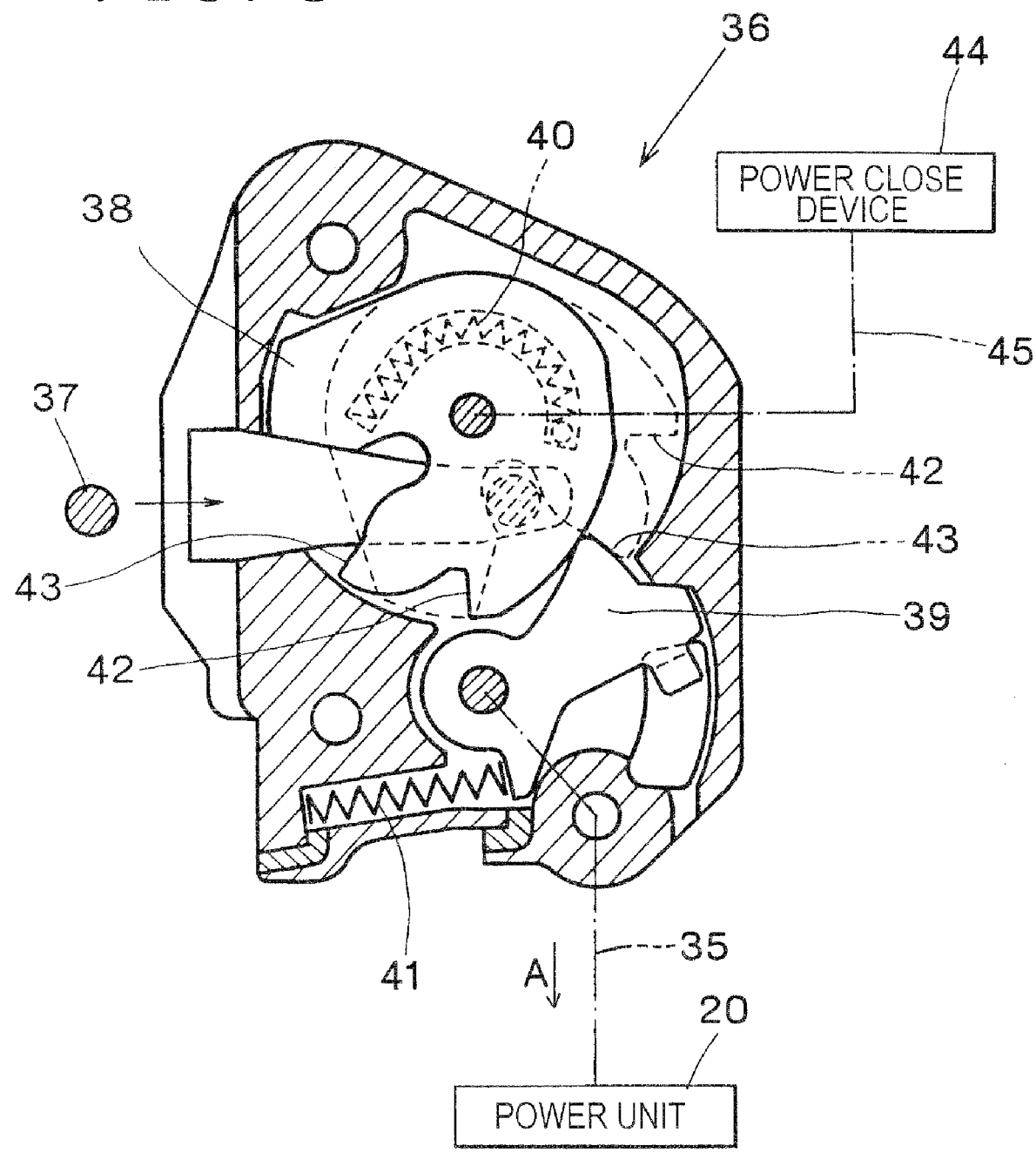
FIG. 8 is a cross sectional view of a door latch unit.

One end of a release cable 35 is connected to a tipe end of the swing arm 33. The other end of the release cable 35 is coupled to a door latch unit 36 (FIGS. 1 and 8) of the sliding door 11. When the release cable 35 is pulled in the direction of an arrow A by swinging the swing arm 33, the door latch unit 36 is released. An example of the door latch unit 36 is shown in FIG. 8 and the door latch unit 36 includes a latch 38 engageable with a striker 37 (FIG. 1) secured to the vehicle body 10 and a ratchet 39 engageable with the latch 38. The latch 38 is urged in the clockwise direction by the elasticity of a latch spring 40, and the ratchet 39 is urged by the elasticity of a ratchet spring 41 in the counterclockwise direction. When the sliding door 11 is moved in the door-closing direction, the latch 38 is brought into contact with the striker 37 and is rotated from a door-open position (an unlatched position) shown by a solid line through a half-latched position where the ratchet 39 is engageable with a half-latched step 42 of the latch 38 to a full-latched position (the position shown by a dotted line) where the ratchet 39 is engageable with a full-latched step 43 of the latch 38, and when the ratchet 39 is engaged with the full-latched step 43, the closing of the sliding door 11 is completed. The release cable 35 is operatively connected to the ratchet 39, and when the release cable 35 is pulled in the direction of the arrow A the ratchet 39 is disengaged from the latch 38 to unlatch the door latch unit 36, thereby the sliding door 11 is placed in an openable state. The function of swing the swing arm 33 through the power of the motor 24 for unlatching the door latch unit 36 is the power releasing function of the power unit 20.

The first clutch 31, which is shown in FIG. 7 in detail, is a clutch which is turned on and off by electrical control. Basically, when an electromagnetic coil 60 is turned on, the clutch is engaged, and when the electromagnetic coil 60 is turned off, the clutch is disengaged. The electromagnetic coil 60 has a cylindrical shape and is disposed around the first supporting shaft 28. The electromagnetic coil 60 is fixed relatively to the case 29, and the first supporting shaft 28 is rotatable relatively to the electromagnetic coil 60. The first worm wheel 26 is rotatably supported around the outer circumference of the electromagnetic coil 60. An annular armature 61 is disposed on the left side of the electromagnetic coil 60 in the vicinity of thereof. The armature 61 is rotatably mounted on the first supporting shaft 28 and is movably in the axial direction of the shaft 28. The armature 61 is urged leftward by the week elasticity of a spring 62 so as to separate from the electromagnetic coil 60 and is abutted against a step of the first supporting shaft 28. When the electromagnetic coil 60 is turned on, the right surface of the armature 61 is caused to come into intimate contact with the left surface of the electromagnetic coil 60 by the magnetic force of the electromagnetic coil 60. The frictional resistance generated by this intimate contact acts as a brake resistance required for the clutch engagement. Since the brake resistance required for the clutch engagement is little and the armature 61 can be placed in the vicinity of the electromagnetic coil 60, the electromagnetic coil 60 is required to generate only little magnetic force, thereby allowing the use of a lightweight, compact and low-cost electromagnetic coil.

Figure 9:
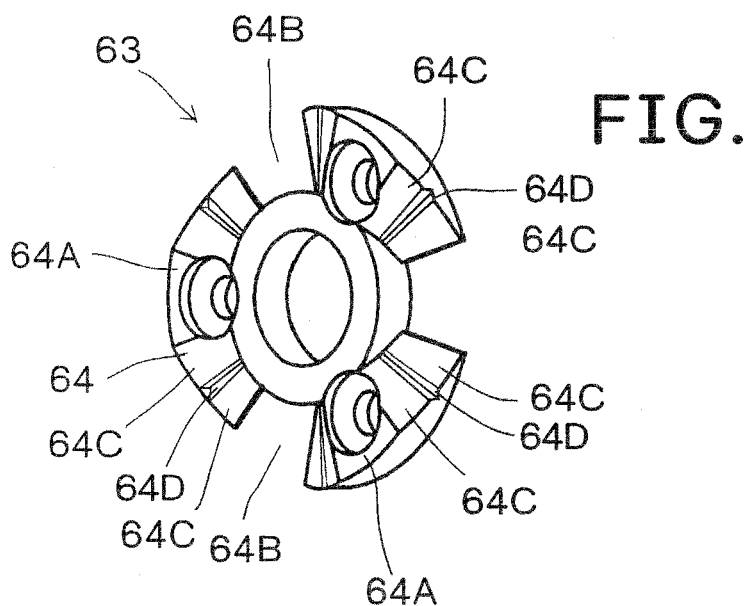
FIG. 9 is a perspective view of a cam member.
Figure 11:
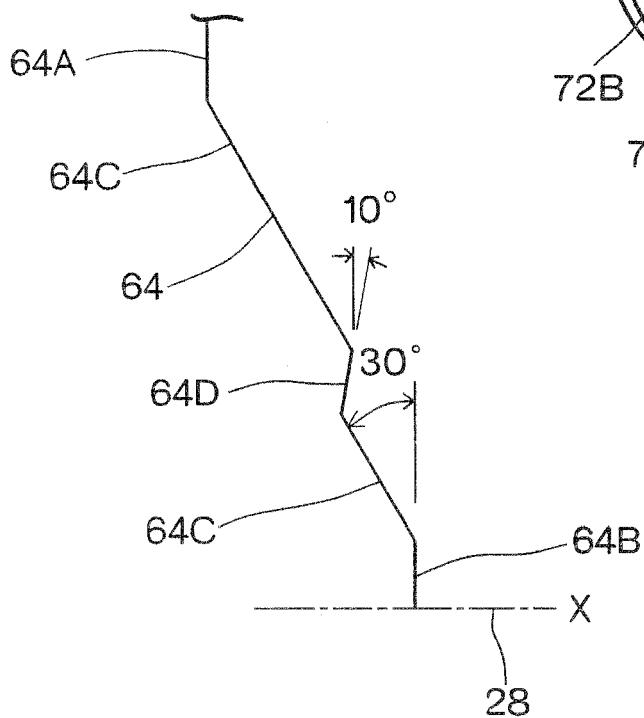
FIG. 11 is a detail view of a cam surface of the cam member.

A cam member 63 is secured on the left surface of the armature 61. A cam surface 64 of the cam member 63 is formed into an annular and regular rugged surface, as shown in FIG. 9, having apexes 64A bulged leftward in the axial direction of the first supporting shaft 28, bottom portions 64B formed by cutting-out, and slant surfaces 64C for connecting them. The slant surface 64C is a two-step slant surface having a clutch holding surface 64D in the middle thereof. The clutch holding surface 64D at the middle position is a configuration constituting the main feature of the present invention. As will be described later, the clutch holding surface 64D maintains the clutch in the engaged state even when the electromagnetic coil 60 is turned off. As shown in FIG. 11, the slant surface 64C is a slant surface at an angle of preferably about 30 degree with respect to right angle to the axial line X of the first supporting shaft 28, and the clutch holding surface 64D may be flat surface orthogonal to the axial line X. However, the clutch holding surface 64D is preferably formed as a sweep-back surface at an angle of about 10 degree.

Figure 10:
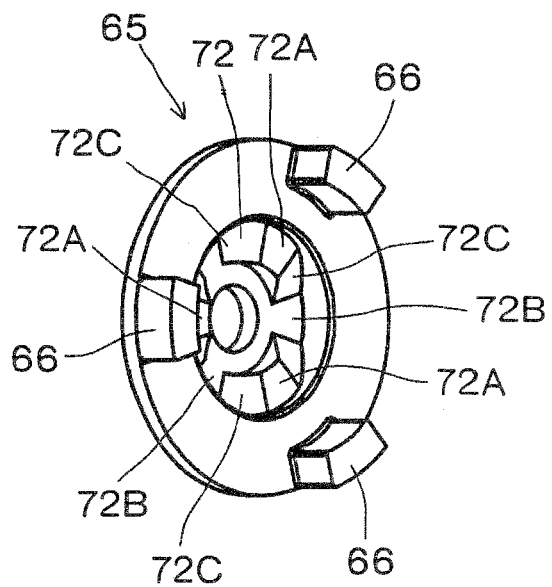
FIG. 10 is a perspective view of a movable gear member.

A movable gear member 65 (FIG. 10) is provided at the left of the cam member 63. The movable gear member 65 is rotatably mounted on the first supporting shaft 28 rotatably and movably in the axial direction of the shaft. A plurality of leg portions 66 extending rightward are formed on the outer periphery of the movable gear member 65. The right tip ends of the leg portions 66 are engaged with engaging grooves 67 of the first worm wheel 26 so that the movable gear member 65 is rotated by the rotation of the first worm wheel 26 in association therewith. The leg portions 66 are slidable with respect to the engaging grooves 67 in the axial direction of the first supporting shaft 28, but the leg portions 66 are disengageable from the engaging grooves 67 even if the movable gear member 65 is moved in the axial direction of the first supporting shaft 28. Therefore, the movable gear member 65 is always rotated together with the first worm wheel 26. On the left surface of the movable gear member 65, a movable annular gear portion 68 centered on the first supporting shaft 28 is formed.

A stationary gear member 69 is disposed at the left side of the movable gear member 65, and a spring 70 for pushing out the movable gear member 65 rightward is provided between the movable gear member 65 and the stationary gear member 69. The left surface of the stationary gear member 69 is secured to the wire drum 30 and they rotate integrally. The wire drum 30 is secured to the left side of the first supporting shaft 28 such that the wire drum 30 rotates integrally with the first supporting shaft 28. A stationary annular gear portion 71 is provided on the right surface of the stationary gear member 69. When the movable gear member 65 slides leftward against the elasticity of the spring 70 .with respect to the first supporting shaft 28, the movable annular gear portion 68 meshes with the stationary annular gear portion 71, and then the clutch-engaged state is accomplished. Thus the rotation of the first worm wheel 26 can be transmitted to the wire drum 30. On the contrary, when the movable gear member 65 is slid rightward by the elasticity of the spring 70 with respect to the first supporting shaft 28, the movable annular gear portion 68 is separated from the stationary annular gear portion 71, and then the clutch becomes the clutch-disengaged state. Thus the rotation of the first worm wheel 26 is no longer transmitted to the wire drum 30.

The movable gear member 65 has a cam surface 72 for sliding the movable gear member 65 leftward against the elasticity of the spring 70 in cooperation with the cam surface 64 of the cam member 63. The cam surface 72 is an annular and regular rugged surface having apexes 72A bulged rightward in the axial direction of the first supporting shaft 28, bottom portions 72B, and slant surfaces 72C for connecting them. The cam surface 72 has a symmetric structure with respect to the cam surface 64, but include no clutch holding surface. However, by forming the clutch holding surfaces 64D on any one of the cam surface 64 and the cam surface 72, desired effects can be obtained.

Figure 12:
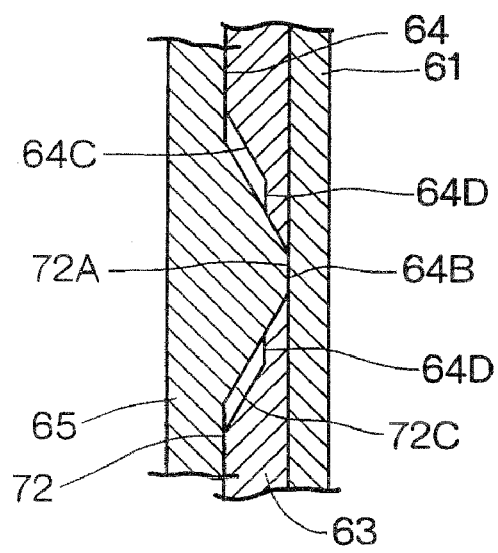
FIG. 12 is a side view illustrating the cam surface of the cam member and a cam surface of the movable gear member in a clutch-disengaged state.
Figure 13:
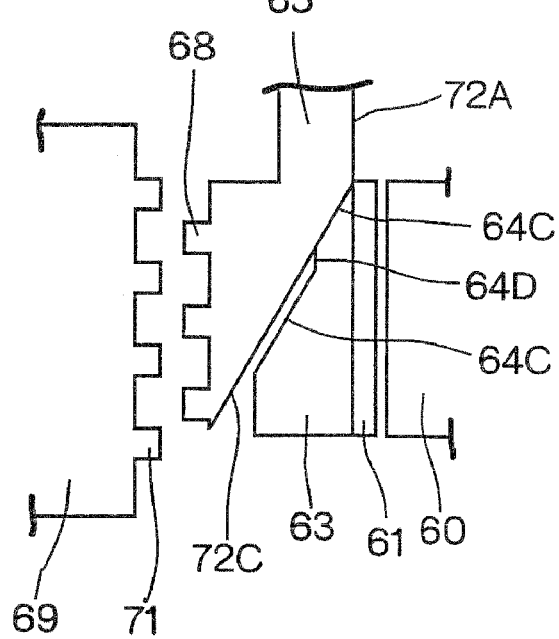
FIG. 13 is a schematic view illustrating the movable gear member and a stationary gear member in the clutch-disengaged state, corresponding to FIG. 12.
Figure 14:
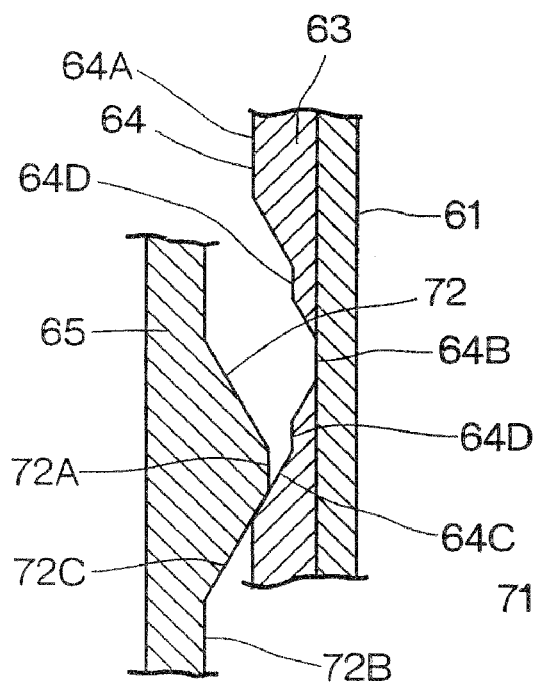
FIG. 14 is a side view illustrating the cam surface of the cam member and the cam surface of the movable gear member in a clutch-engaged state.

When the movable gear member 65 is slid rightward by the elasticity of the spring 70, as shown in FIG. 12, the apexes 72A of the cam surface 72 usually closely conform to the bottom portions 64B of the cam surface 64, and the movable annular gear portion 68 is separated from the stationary annular gear portion 71 as in the schematic view of FIG. 13, thereby the clutch is held in the disengaged state. In this clutch-disengaged state, when the electromagnetic coil 60 is turned on, the right surface of the armature 61 is attracted towards the left surface (frictional surface) of the electromagnetic coil 60 by the magnetic force and is brought into intimate contact therewith and thus the break resistance is applied to the armature 61 and the cam member 63. Then, when the movable gear member 65 (the cam surface 72) is rotated by the power of the motor 24, the cam surface 72 and the cam surface 64 of the cam member 63 are shifted in phase from each other as shown in FIG. 14 since the rotation of the cam member 63 is restricted, and the movable gear member 65 is pushed out leftward against the elasticity of the spring 70. Thus, as shown in FIG. 15, the movable annular gear portion 68 is engaged with the stationary annular gear portion 71 to cause the clutch to be engaged.

Figure 15:
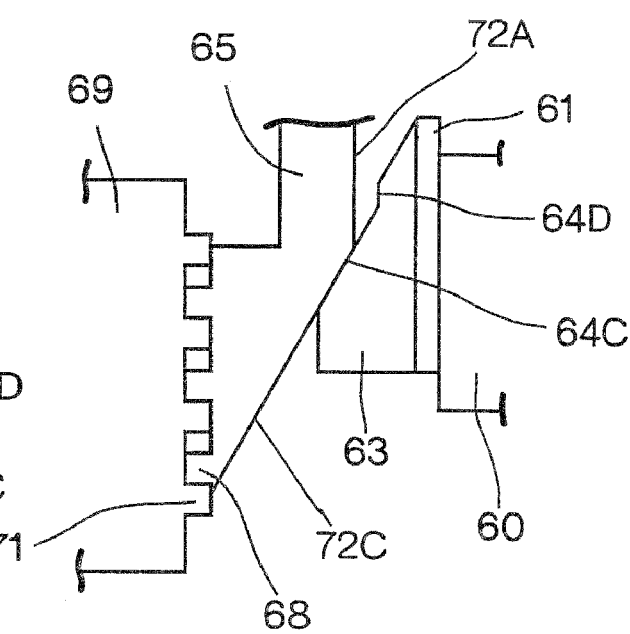
FIG. 15 is a schematic view illustrating the movable gear member and the stationary gear member in the clutch-engaged state, corresponding to FIG. 14.
Figure 16:
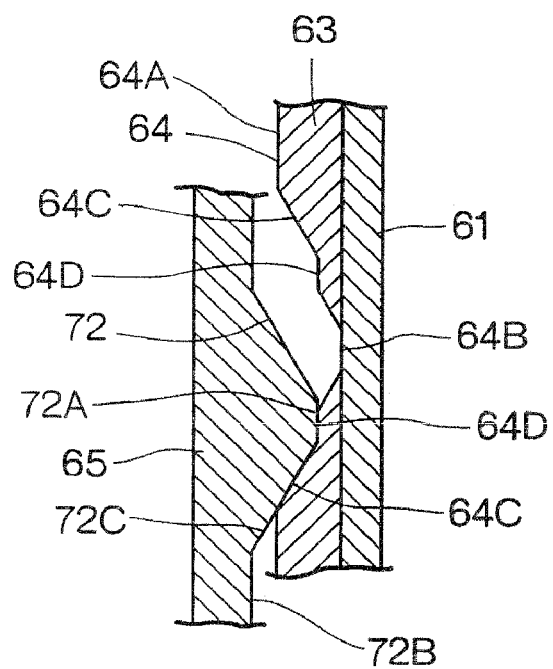
FIG. 16 is a side view illustrating the cam surface of the cam member and the cam surface of the movable gear member in the clutch-engaged state, when the electromagnetic coil is in an OFF state.
Figure 17:
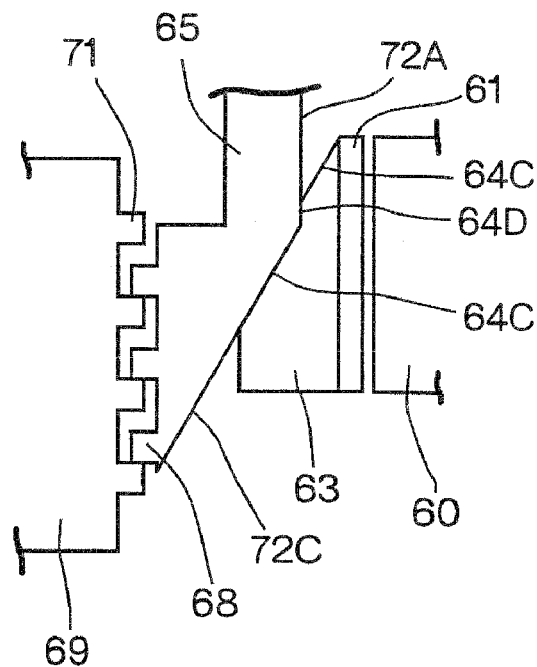
FIG. 17 is a schematic view illustrating the movable gear member and the stationary gear member in the clutch-engaged state, corresponding to FIG. 16.

When the motor 24 and the electromagnetic coil 60 are both turned off in the clutch-engaged state shown in FIGS. 14, 15, the movable gear member 65 moves rightward by the elasticity of the spring 70 while causing the armature 61 and the cam member 63 released from the break resistance to rotate in the relief direction. Then, before the movable gear member 65 and the stationary gear member 69 are disengaged from each other, the apexes 72A of the movable gear member 65 abut on the clutch holding surfaces 64D as shown in FIGS. 16 and 17, which restricts the rightward movement of the movable gear member 65 caused by the elasticity of the spring 70. In this state, the abutment between the apexes 72A and the clutch holding surfaces 64D can not be released unless the armature 61 and the cam member 63 are moved downward in FIG. 16 or the movable gear member 65 is moved upward in FIG. 16. However, the armature 61 and the cam member 63 can not be moved downward and also the movable gear member 65 can not be moved since it engages with the first worm wheel 26. Therefore, even when the electromagnetic coil 60 is in the OFF state, the clutch-engaged state can be maintained. Further, by causing this state on purpose, for example, in the power slide device as the present embodiment, the sliding door 11 can be retained at a desired position by the resistance force of the reduction gear in the motor 24 side.

The second clutch 34 has the same configuration as that of the first clutch 31, and has a cylindrical electromagnetic coil 73, an annular armature 74, a spring 75, a cam member 76, a cam surface 77 of the cam member 76, a movable gear member 78, leg portions 79, engaging grooves 80, a movable annular gear portion 81, a stationary gear member 82, a spring 83, a stationary annular gear portion 84, and a cam surface 85 of the movable gear member 78. The stationary gear member 82 of the second clutch 34 is secured to a receiving member 86 secured to the left end of the second supporting shaft 32.

In FIG. 8, the sliding door 11 has a power close device 44 attached to the inside thereof. The motor power from the power close device 44 is transmitted to the latch 38 of the door latch unit 36 through a close cable 45. In the shown embodiment, the power close device 44 is arranged as a device independent of the power unit 20. When the latch 38 is displaced into the half-latched position by the movement of the sliding door 11 in the door-closing direction, the power close device 44 pulls the close cable 45 to cause the latch 38 to rotate from the half-latched position to the full-latched position, thereby the sliding door 11 is completely closed.

In FIG. 7, one end of the first supporting shaft 28 penetrates the case 29 and protrudes to the outside, and a gear 51 is secured to the protruded end of the shaft. The gear 51 is engaged with a rotary member 52. When the rotation of the wire drum 30 causes the first supporting shaft 28 to rotate, the rotary member 52 rotates in conjunction therewith. Reference numeral 53 is a control board of the power unit 20, and a sensor 54 for detecting the rotation (and the direction of rotation, the speed of rotation) of the rotary member 52 is directly mounted on the control board 53. In a preferred embodiment of the rotary member 52, S-pole magnetic materials and N-pole magnetic materials are disposed on the rotary member circumferentially at intervals, and the sensor 54 is a Hall IC for detecting magnetism. By mounting the sensor 54 directly on the control board 53, no harness is required, which produces effects against electrical noises from the outside.

The power unit 20 shown in FIGS. 6 and 7 has a power sliding function and a power releasing function, and both the functions share the single motor 24.

(Operations)

The effects of the first clutch 31 will be explained. When the electromagnetic coil 60 is in the OFF state, there is no substantial frictional resistance generated between the armature 61 and the electromagnetic coil 60. In this state, when the cylindrical worm 25 is rotated by the normal rotation of the motor 24, the first worm wheel 26 is rotated in the clockwise direction in FIG. 6, and the movable gear member 65 is also rotated in the clockwise direction by the engagement between the leg portions 66 and the engaging grooves 67. At this time, the movable gear member 65 is moved rightward by the elasticity of the spring 70 and the movable gear portion 68 of the movable gear member 65 is, as shown in FIG. 7, separated from the stationary gear portion 71 of the stationary gear member 69 (This is the clutch-disengaged state.). Further, as shown in FIGS. 12 and 13, the cam surface 72 of the movable gear member 65 comes into contact with the cam surface 64 of the cam member 63 in adjacent to each other. Therefore, in this state, the normal rotation of the motor 24 causes the movable gear member 65, the cam member 63 and the armature 61 integral with the cam member 63 rotate together.

In the above state, when the electromagnetic coil 60 is turned on, the armature 61 is attracted towards the electromagnetic coil 60 by the generated magnetic force and predetermined break resistance is generated between the electromagnetic coil 60 and the armature 61. This restricts the co-rotation of the armature 61 and the cam member 63, and the movable gear member 65 is rotated about the first supporting shaft 28 with respect to the cam member 63. Then, the cam surface 72 and the cam surface 64 are shifted in phase from each other as shown in FIG. 14, and the movable gear member 65 is pushed out towards the stationary gear member 69, thereby the movable annular gear portion 68 of the movable gear member 65 is engaged with the stationary gear portion 71 of the stationary gear member 69 to cause the clutch-engaged state. Thus, the rotation of the motor 24 is transmitted to the wire drum 30 through the stationary gear member 69, and the door-closing cable 21" is wound, thereby moving the sliding door 11 in the door-closing direction. After the accomplishment of the clutch-engaged state, the armature 61 and the cam member 63 rotate together with the movable gear member 65.

During the movement of the sliding door 11 in the door-closing direction, if the motor 24 and the electromagnetic coil 60 are turned off, the movable gear member 65 begins to move rightward by the elasticity of the spring 70 even though the movable gear member 65 does not rotate since it engages with the first worm wheel 26. The rightward movement of the gear member 65 causes the armature 61 and the cam member 63 to rotate in the relief direction (the downward direction in FIG. 15). Then, before the movable gear member 65 is disengaged from the stationary gear member 69, as shown in FIGS. 16 and 17, the apexes 72A of the movable gear member 65 are brought into contact with the clutch holding surfaces 64D, thereby the further rightward movement of the movable gear member 65 by the elasticity of the spring 70 is restricted. At this state, the abutment between the apexes 72A and the clutch holding surfaces 64D can not be released unless the armature 61 and the cam member 63 are moved downward in FIG. 16 or the movable gear member 65 is moved upward in FIG. 16. However, the armature 61 and the cam member 63 can not be moved downward and also the movable gear member 65 can not be moved since gear member 65 engages with the first worm wheel 26. Therefore, even when the electromagnetic coil 60 is in the OFF state, the clutch-engaged state can be maintained. Therefore, the sliding door 11 is maintained at the position where the motor 24 and the electromagnetic coil 60 are turned off. With this function, the sliding door 11 can be stopped and retained at an arbitrary position by operator's purpose and also can be stopped and retained at a state where the sliding door is half-opened (or half-closed) by automatic operation through the control section.

Figure 18:
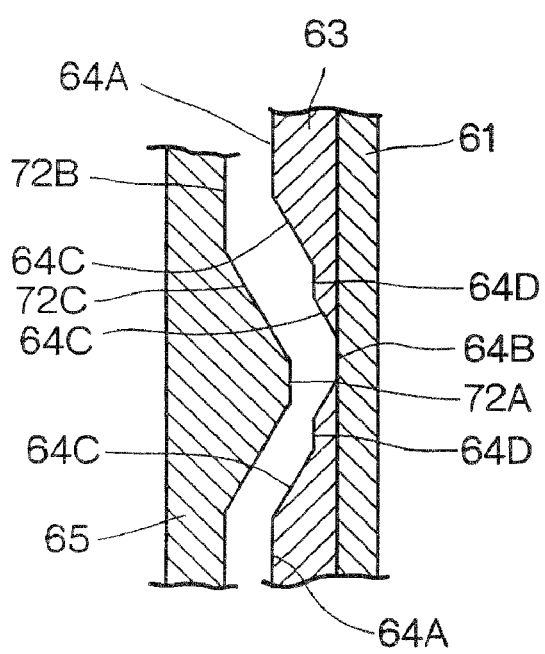
FIG. 18 is a side view illustrating the cam surface of the cam member and the cam surface of the movable gear member in the middle of releasing the clutch-engaged state.
Figure 19:
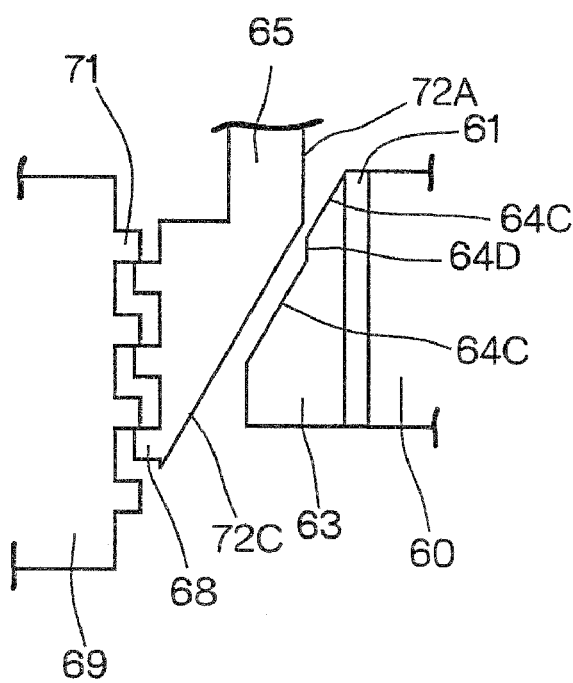
FIG. 19 is a schematic view illustrating the movable gear member and the stationary gear member in the middle of releasing the clutch-engaged state, corresponding to FIG. 18.

When the sliding door 11 has been closed, the motor 24 is rotated in the opposite direction for a predetermined time (by a predetermined amount). Then, since the electromagnetic coil 60 is continuously in the ON state, the movable gear member 65 moves upward in FIG. 15 by a predetermined amount while the armature 61 and the cam member 63 are retained. Thus, as shown in FIGS. 18 and 19, the apexes 72A are moved beyond the clutch holding surfaces 64D of the cam member 63, and the electromagnetic coil 60 and the motor 24 are then turned off. As a result, the movable gear member 65 can be moved rightward by the elasticity of the spring 70 without causing the apexes 72A to abut on the clutch holding surfaces 64D of the cam member 63.

(Effect of the Invention)

In the present invention, even when the electromagnetic coil 60 is turned off, the clutch can be continuously maintained at the engaged state. Therefore, for example, in the case where the power device of the present invention is used in a power slide device, since a sliding door which is a member to be driven can be maintained to be coupled to the reduction gear of the motor 24, the sliding door can be retained at a desired position by the large resistance force of the reduction gear. Further, the clutch-engaged state can be maintained without causing power consumption.

The invention claimed is:

1. A power device for a vehicle sliding door comprising:
   a worm wheel rotatable about a supporting shaft by a motor;
   a stationary gear member supported by the supporting shaft;
   a clutch mechanism for transmitting the rotation of the wheel to the stationary gear member; and
   said clutch mechanism comprising a movable gear member rotatable integrally with the wheel and engagable with the stationary gear member when the movable gear member is moved in a first direction and disengaged from the stationary gear member when the movable gear member is moved in a second direction opposite to the first direction; an armature which moves the movable gear member in the first direction when the armature is rotated relative to the movable gear member; and an electromagnetic coil for applying a break resistance to the armature by attracting the armature by a magnetic force in order to rotate the armature relative to the movable gear member;
   wherein said armature is provided with a clutch holding surface which maintains a clutch-engaged state where the movable gear member and the stationary gear member are engaged with each other even when the electromagnetic coil is turned off; and
   wherein said armature is provided with a cam surface having a slant surface angled with respect to an axis of said shaft and said clutch holding surface protrudes transverse to and approximately halfway along the length of the slant surface.

2. A power device for a vehicle sliding door according to claim 1, wherein said slant surface is inclined at an angle of 20 to 40 degrees with respect to said axis of the supporting shaft and the clutch holding surface is a flat surface orthogonal to the axis or at angle of about 10 degrees relative to said axis.

3. A power device for a vehicle sliding door, comprising:
   a worn wheel rotatable about a supporting shaft by a motor;
   a stationary gear member supported by the supporting shaft;
   a clutch mechanism for transmitting the rotation of the wheel to the stationary gear member; and
   said clutch mechanism comprising a movable gear member rotatable integrally with the wheel and engageable with the stationary gear member when the movable gear member is moved in a first direction and disengaged from the stationary gear member when the movable gear member is moved in a second direction opposite to the first direction; an armature which moves the movable gear member in the first direction when the armature is rotated relative to the movable gear member; and an electromagnetic coil for applying a break resistance to the armature by attracting the armature by a magnetic force in order to rotate the armature relative to the movable gear member;
   wherein said movable gear member is provided with a clutch holding surface which maintains a clutch-engaged state where the movable gear member and the stationary gear member are engaged with each other even when the electromagnetic coil is turned off
   wherein said movable gear member is provided with a cam surface having a slat surface angled with respect to an axis of said shaft and said clutch holding surface protrudes transverse to and approximately halfway along the length of the slant surface.

4. A power device for a vehicle sliding door according to claim 3, wherein said slant surface is inclined at an angle of 20 to 40 degrees with respect to said axis of the supporting shaft and the clutch holding surface is a flat surface orthogonal to the axis or at angle of about 10 degrees relative to said axis.

* * * * *